US009020557B2

(12) United States Patent
Ozaki et al.

(10) Patent No.: US 9,020,557 B2
(45) Date of Patent: Apr. 28, 2015

(54) WIRELESS COMMUNICATION APPARATUS AND METHOD FOR WIRELESS COMMUNICATION

(75) Inventors: Kazuyuki Ozaki, Yokohama (JP); Yun Wen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 13/613,252

(22) Filed: Sep. 13, 2012

(65) Prior Publication Data

US 2013/0137477 A1 May 30, 2013

(30) Foreign Application Priority Data

Nov. 30, 2011 (JP) ................. 2011-263064

(51) Int. Cl.
| | | |
|---|---|---|
| H04B 7/00 | (2006.01) | |
| H04W 52/36 | (2009.01) | |
| H04W 52/46 | (2009.01) | |
| H04W 52/28 | (2009.01) | |

(52) U.S. Cl.
CPC ............ *H04W 52/367* (2013.01); *H04W 52/46* (2013.01); *H04W 52/283* (2013.01)

(58) Field of Classification Search
USPC ............ 455/522, 69–70, 7–25; 370/310–320
See application file for complete search history.

(56) References Cited

U.S. PATENT DOCUMENTS

| | | | |
|---|---|---|---|
| 6,748,233 B1 * | 6/2004 | Arnold et al. .................. | 455/522 |
| 7,184,703 B1 * | 2/2007 | Naden et al. .................... | 455/10 |
| 2007/0242621 A1 | 10/2007 | Nandagopalan et al. | |
| 2009/0303925 A1 * | 12/2009 | Li et al. ......................... | 370/328 |
| 2010/0110973 A1 * | 5/2010 | Hart .............................. | 370/315 |

FOREIGN PATENT DOCUMENTS

| | | |
|---|---|---|
| JP | 2009-533976 | 9/2009 |
| JP | 2010-161516 | 7/2010 |
| JP | 2011-55394 | 3/2011 |

* cited by examiner

*Primary Examiner* — Fayyaz Alam
(74) *Attorney, Agent, or Firm* — Katten Muchin Rosenman LLP

(57) ABSTRACT

A wireless communication apparatus includes: an estimating section to estimate a positional relationship between a destination node and a node; a first determination section to set an electric power larger than or equal to minimum power as a first transmission power if the node is estimated to be located in a first area, the minimum power being detected by a node at the largest distance from the node in the first area; a second determination section that set an electric power smaller than a minimum power as a second transmission power if the node is estimated to be located in an area other than the first area, the minimum power being detected by the destination; and a transmitting section to transmit data to the destination node with the first transmission power or the second transmission power.

10 Claims, 6 Drawing Sheets

WIRELESS COMMUNICATION APPARATUS AND METHOD FOR WIRELESS COMMUNICATION

CROSS-REFERENCE TO RELATED APPLICATION(S)

This application is based upon and claims the benefit of priority of the prior Japanese Patent Application No. 2011-263064, filed on Nov. 30, 2011, the entire contents of which are incorporated herein by reference.

FIELD

The embodiments discussed therein are related to a wireless communication apparatus and a method for wireless communication.

BACKGROUND

In a multihop wireless communication system, nodes are coupled to a destination node via a plurality of relay nodes. In the multihop wireless communication system, the individual nodes execute communication autonomously using a carrier sense multiple access with collision avoidance (CSMA/CA) system.

Related art is disclosed in Japanese National Publication of International Patent Application No. 2009-533976, Japanese Laid-open Patent Publication No. 2010-161516, and Japanese Laid-open Patent Publication No. 2011-055394.

SUMMARY

According to one aspect of the embodiments, a wireless communication apparatus includes: an estimating section to estimate a positional relationship between a destination node and a node; a first determination section to set an electric power larger than or equal to minimum power as a first transmission power if the node is estimated to be located in a first area, the minimum power being detected by a node at the largest distance from the node in the first area; a second determination section that set an electric power smaller than a minimum power as a second transmission power if the node is estimated to be located in an area other than the first area, the minimum power being detected by the destination; and a transmitting section to transmit data to the destination node with the first transmission power or the second transmission power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the CSMA/CA, individual nodes execute carrier sensing to monitor received signal strength indication (RSSI) before communication. If a RSSI lower than or equal to a certain value is detected, the nodes determine that the other nodes are not transmitting signals and execute data transmission.

Data collision may occur between a transmission node and the other nodes that are located in a range in which direct communication with a destination node is possible and that do not detect transmission of the transmission node by carrier sensing. For example, data collision may occur between the transmission node and a node in which reception power from the transmission node is lower than or equal to a threshold value (hereinafter referred to as a hidden terminal).

To reduce data collision of the hidden terminal, the transmission node makes a notification that the transmission node is in a data transmission mode by signal transmission to a target transmission area. Furthermore, after the transmission node transmits a transmission request to the destination node by using a request to send (RTS)/clear to send (CTS) signal, and confirms that the destination node is in a receivable mode, data transmission is executed.

Figure 1:
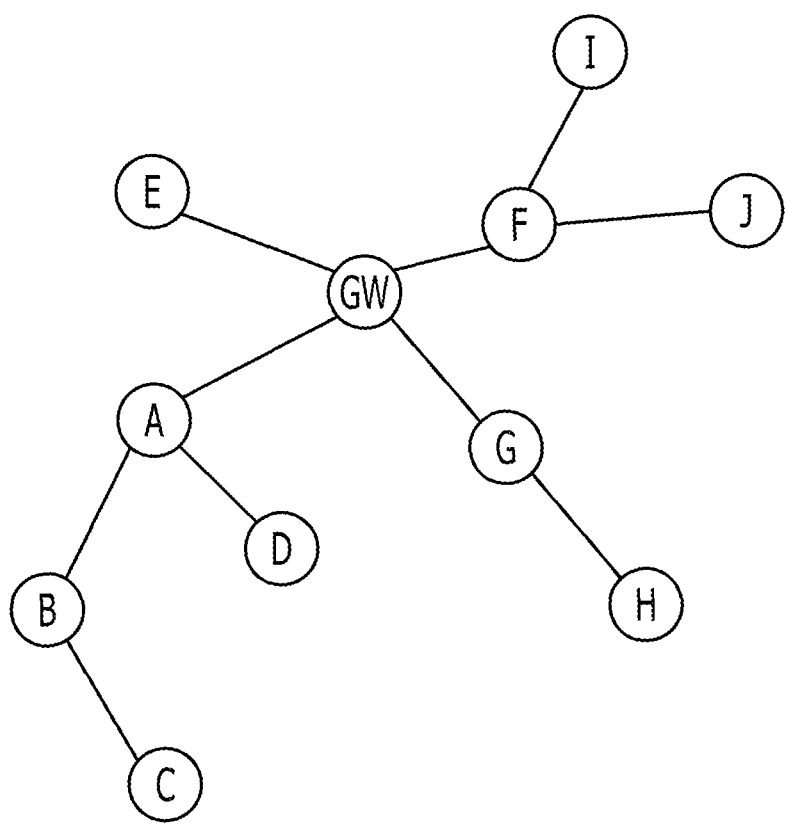
FIG. 1 illustrates an exemplary wireless communication system.

FIG. 1 illustrates an exemplary wireless communication system. The wireless communication system includes nodes A to I and a gateway (GW) unit. The nodes A to I may correspond to a wireless communication apparatus.

The nodes A to I illustrated in FIG. 1 constitute an ad hoc network that automatically determines channel information. The individual nodes A to I exchange their channel information with a node coupled in one hop, for example, an adjacent node, using a control packet, such as a HELLO message. The individual nodes A to I determine channels to the GW unit by using the exchanged channel information.

The nodes A to I are coupled to a wattmeter or a sensor and transmit sensor values to the GW unit. The GW unit may correspond to a wireless communication apparatus coupled to a control unit that collects sensor values from the nodes A to I. The sensor values may include electric power, temperature, humidity, and acceleration.

In the wireless communication system illustrated in FIG. 1, the nodes A, E, F, and G may be nodes present in an area with which the GW unit can directly communicate so as to be able to transmit data directly to the GW unit in one hop. The nodes B and D may be multihop nodes that transmit data to the GW unit via the node A. The node C may be a multihop node that transmits data to the GW unit via both of the nodes B and A. The node H may be a multihop node that transmits data to the GW unit via the node G. The nodes I and J may be multihop nodes that transmit data to the GW unit via the node F.

The nodes A to I autonomously execute communication using the CSMA/CA system. For example, the nodes A to I individually execute carrier sensing to measure the reception power levels of the carrier-wave frequencies before data transmission. If the measured reception power levels are lower than or equal to a threshold value, the nodes A to I determine that the channels are idle and execute data transmission. If the measured reception power levels are larger than the threshold value, the nodes A to I determine that the channels are busy, cancel the data transmission, and execute carrier sensing after a lapse of a certain time.

The nodes A to I may be nodes that constitute a multihop wireless network. Each of the local nodes estimates the positional relationship between a destination node that is the destination of data and itself. If each of the local nodes estimates to be located in a first area within the maximum distance with which the destination node can directly communicate, each of the local nodes determines an electric power larger than or equal to the minimum power, which the other nodes in the first area can detect, as a transmission power. If each of the local nodes estimates to be in an area other than the first area, each of the local nodes determines electric power smaller than the minimum power, which the destination node can detect to be transmission power, as a transmission power. The nodes transmit data to the destination node with the determined transmission power.

The nodes in the wireless communication system determine whether to communicate with the destination GW unit directly or via multihop relay. The node that communicates directly with the GW unit control the transmission power so that the other nodes can execute carrier sensing. The node that communicates with the GW unit via multihop relay control the transmission power so as not to interfere with the communication of the node that communicates directly with the GW unit. Therefore, data collisions may be reduced and a decrease in the throughput of the network may be reduced.

Figure 2:
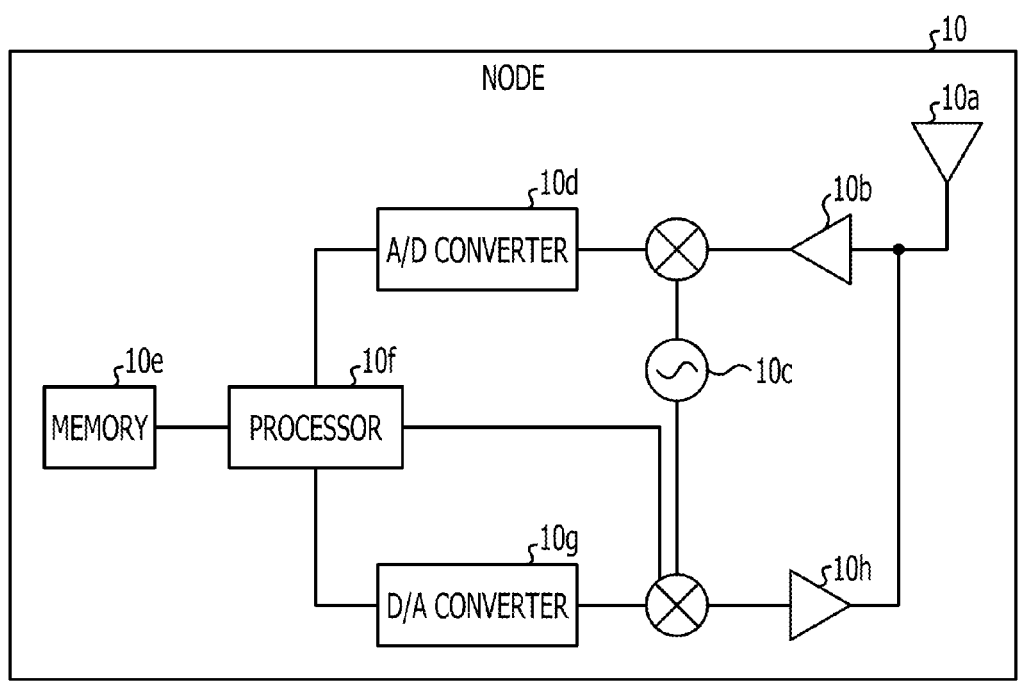
FIG. 2 illustrates an exemplary node.

FIG. 2 illustrates an exemplary node. A node illustrated in FIG. 2 may correspond to the nodes of the wireless communication system in FIG. 1. FIG. 2 illustrates the hardware configuration of the node. The nodes in FIG. 1 may have substantially the same or similar configuration.

The node 10 includes a transmitting and receiving antenna 10a, an amplifier 10b, an oscillator 10c, an analog-to-digital converter 10d, a memory 10e, a processor 10f, a digital-to-analog converter 10g, and an amplifier 10h.

The transmitting and receiving antenna 10a may be hardware that transmits a signal, which is data, to a destination as radio waves and receives a signal, which is data, as radio waves. The amplifier 10b amplifies the signal received by the transmitting and receiving antenna 10a. The oscillator 10c generates a continuous-wave alternating-current signal. The received signal is converted to a baseband signal by using the output from the oscillator 10c.

The analog-to-digital converter 10d converts the analog signal amplified by the amplifier 10b to a digital signal. The memory 10e stores a predetermined threshold and so on. The processor 10f manages the overall process of the node 10 and calculates transmission power by using the signal output from the analog-to-digital converter 10d.

The digital-to-analog converter 10g converts a signal output from the processor 10f to an analog signal. The amplifier 10h amplifies the analog signal converted by the digital-to-analog converter 10g to transmission power transmitted from the processor 10f. The antenna 10a transmits the signal amplified by the amplifier 10h to the destination.

Figure 3:
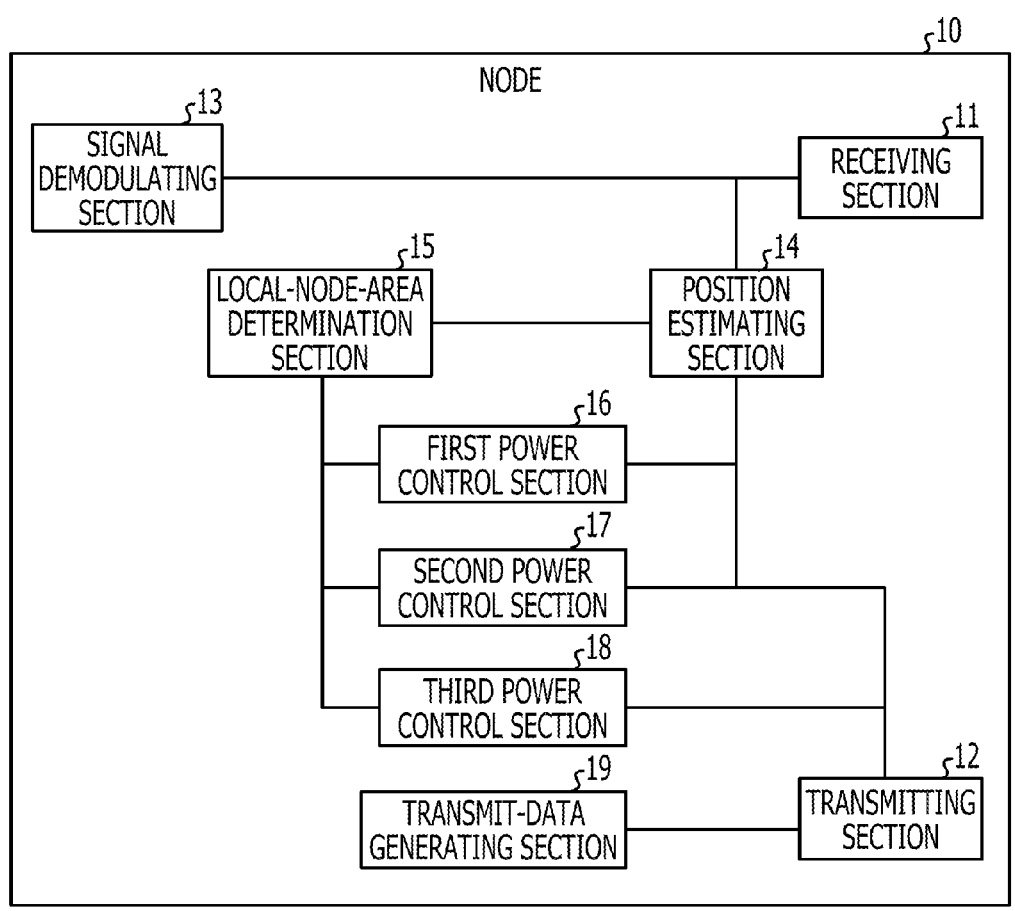
FIG. 3 illustrates an exemplary node.

FIG. 3 illustrates an exemplary node. The node 10 in FIG. 3 may correspond to the nodes of the wireless communication system in FIG. 1. FIG. 3 indicates a functional block diagram of the node 10. The node 10 includes a receiving section 11, a transmitting section 12, a signal demodulating section 13, a position estimating section 14, an local-node-area determination section 15, a first power control section 16, a second power control section 17, a third power control section 18, and a transmit-data generating section 19.

The receiving section 11 and the transmitting section 12 may correspond to the antenna 10a, the transmitting and receiving antenna 10a, the amplifier 10b, the oscillator 10c, the analog-to-digital converter 10d, the digital-to-analog converter 10g, and the amplifier 10h in FIG. 2. The signal demodulating section 13, the position estimating section 14, the local-node-area determination section 15, the first power control section 16, the second power control section 17, the third power control section 18, and the transmit-data generating section 19 may be executed by the processor 10f.

The receiving section 11 receives data, amplifies and converts the data to a digital signal, generates a continuous-wave alternating-current signal, and converts it to a baseband signal. The transmitting section 12 converts signals transmitted from the power control sections 16 to 18 to analog signals, amplifies the signals to transmission power transmitted from the power control section, and transmits the signals to the destination. The signal demodulating section 13 demodulates the digital signal output from the receiving section 11 to extract the received data.

The position estimating section 14 may correspond to a node that constitutes the multihop wireless network and estimates the positional relationship between the destination node, which is the destination of the data, and the node. For example, the position estimating section 14 of the node estimates the positional relationship between the GW unit and the node based on reception power when receiving a known signal from the GW unit, which is the destination node. An example of the known signal includes a control signal, such as a HELLO message.

Signal power $P_r$ when a terminal at a distance r (m) from the GW unit receives a known signal transmitted with transmission power P (dB) from the GW unit is expressed as Expression 1:

$$P_r = P^{-1} + G_t + G_r - \text{path\_loss}(r, h_t, h_r, f) \tag{1}$$

$G_r$ (dB) indicates the gain of the receiving antenna of the receiving terminal, $G_t$ (dB) indicates the gain of the transmitting antenna of the transmitting terminal, $h_t$ (m) indicates the antenna height of the transmitting terminal, $h_r$ (m) indicates the antenna height of the receiving terminal, f (Hz) indicates a carrier-wave frequency, and (x, $h_t$, $h_r$, f) indicates a transmission path (dB) having a distance x (m) between the transmitter and the receiver, a transmitting antenna height $h_t$, a receiving antenna height $h_r$, and a carrier-wave frequency f. For example, path_loss(x, $h_t$, $h_r$, f) indicates attenuation. Accordingly, the position estimating section 14 of the node estimates the distance r (m) between the destination node and the node from the reception power $P_r$ of the known signal transmitted based on the destination node by using Expression 2.

$$r = \text{path\_loss}^{-1}(P + G_t + G_r - P_r, h_t, h_r, f) \tag{2}$$

The local-node-area determination section 15 of the node in FIG. 3 determines an area in which the node is located based on the distance estimated by the position estimating section 14. For example, the local-node-area determination section 15 determines which of a one-hop area, a forced multihop area, and a multihop area the local node corresponds to the area. The one-hop area indicates an area from which data is transmitted to the GW unit in one hop. The forced multihop area indicates an area from which data can be transmitted to the GW unit in one hop but is forcedly transmitted via multihop relay. The multihop area indicates an area from which data is transmitted to the GW unit via multihop relay.

Figure 4:
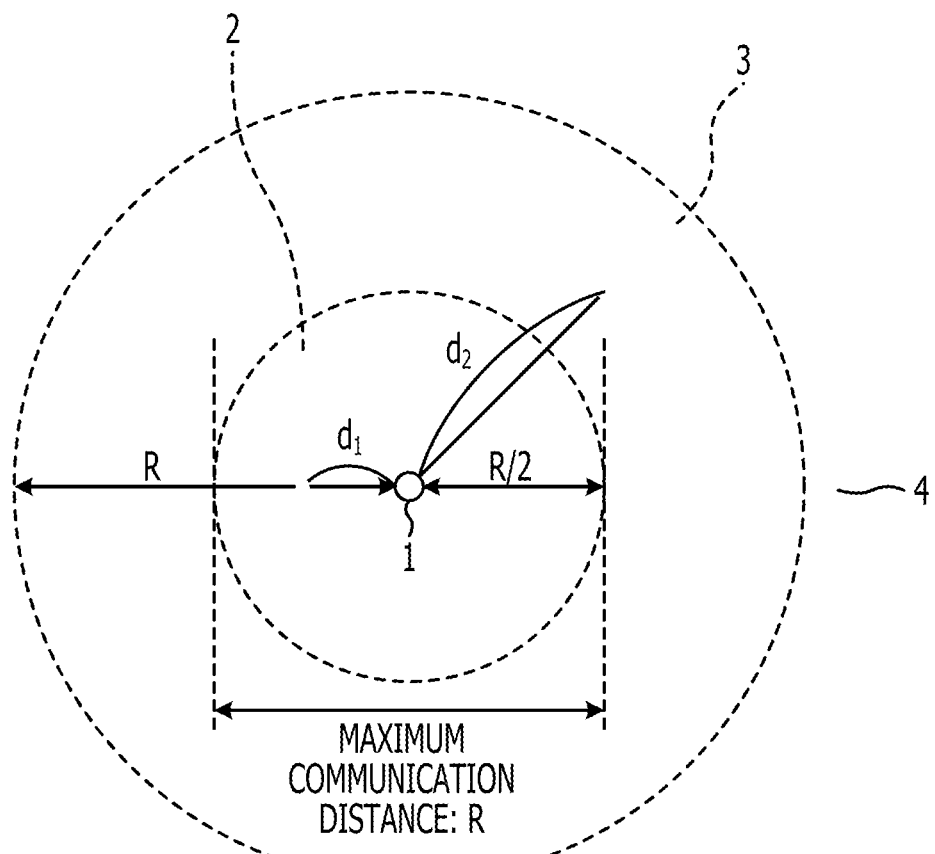
FIG. 4 illustrates an exemplary area determination.

FIG. 4 illustrates an exemplary area determination. The one-hop area indicates an area 2 in the range of half of the maximum distance R (m), (R/2), where a GW unit 1, which is a destination node, can communicate directly. The forced multihop area indicates an area 3 in the range of distance R (m) excluding the area 2. The multihop area indicates an area 4 that is far away more than the distance R (m). The boundaries between the areas may be freely set.

When $P_{max}$ (dB) is the maximum transmission power of the transmitting terminal, $h_{AN}$ (m) is the antenna height of the transmitting terminal, and $P_{cs}$ (dB) is the minimum power with which the receiving terminal can detect a signal, the maximum distance R may be expressed as Expression 3:

$$R = \text{path\_loss}^{-1}(P_{max} + G_t + G_r - P_{cs}, h_{AN}, h_{AN}, f) \tag{3}$$

For example, if the distance r calculated using Expression 2 is half or less of R, (R/2), calculated using Expression 3, the local-node-area determination section 15 of the node determines that the node is located in the one-hop area and outputs a transmission instruction to the first power control section 16. If the distance r calculated using Expression 2 is smaller than or equal to R calculated using Expression 3 and larger than half of R, (R/2), the local-node-area determination section 15 of the node determines that the node is located in the forced hop area and outputs a transmission instruction to the second power control section 17. If the distance r calculated using Expression 2 is larger than R calculated using Expression 3, the local-node-area determination section 15 of the node determines that the node is located in the multihop area and outputs a transmission instruction to the third power control section 18.

If the node is estimated to be located in the one-hop area within the maximum distance with which the destination node can directly communicate, the first power control section 16 of the node illustrated in FIG. 3 controls the transmission power so as to become the minimum power or larger that the other nodes located in the one-hop area can detect. For example, as illustrated in FIG. 4, when the node is located in the one-hop area at a distance of d1 (m) from the GW unit 1, the first power control section 16 controls the transmission power so that the data can reach a node that is at a distance R/2 (m) from the GW unit 1. Therefore, the first power control section 16 of the node controls the transmission power $P_t$ (dB) so as to become the minimum power $P_{cs}$ with which the reception power of the node located at a distance of d+R/2 (m) from the node can be detected. The transmission power $P_t$ (dB) that satisfies the foregoing condition is expressed as Expression 4:

$$P_t = P_{cs} - G_t - G_r + \text{path\_loss}(d_1 + R/2, h_{AN}, h_{AN}, f) \quad (4)$$

The node located at a distance of R/2 (m) from the GW unit 1 and the node located at a distance of d1 (m) from the GW unit 1 may be detected by mutual carrier sensing.

When the node is located in the forced multihop area, the second power control section 17 of the node controls the transmission power so that data can reach the destination node via nodes located in the one-hop area. For example, if the node is located in the forced multihop area of the area 3 in FIG. 4, the second power control section 17 of the node controls the transmission power so that the signal transmitted by the node reaches the GW unit 1 at a transmission power of $P_{rx} - P_1$. $P_{rx}$ denotes the minimum reception power that the GW unit 1 can detect. $P_1$ denotes a predetermined constant larger than 0. The minimum reception power refers to electric power serving as a threshold value when the local node shifts to a receiving mode. When $d_2$ (m) is the distance between the local node and the GW unit 1 and $h_{GW}$ (m) is the antenna height of the GW unit 1, the transmission power $P_t$ (dB) that the second power control section 17 determines is expressed as Expression 5:

$$P_t = P_{rx} - P_1 - G_t - G_r + \text{path\_loss}(d_2, h_{AN}, h_{GW}, f) \quad (5)$$

The node located in the area 3, which is the forced multihop area, does not transmit data to the GW unit 1 unless the node transmits data to nodes located in the area 1, which is the one-hop area, even if unable to transmit the data directly to the GW unit 1. If the distance between the node and the GW unit 1 is $d_2$ (m), the distance between the node and the one-hop area may be d−R/2 (m). Therefore, the second power control section 17 of the node controls the transmission power $P_t$ (dB) so as to satisfy Expression 6 so that data transmitted by the node located in the area 3, which is the forced multihop area, does not reach the destination GW unit 1 but reaches the nodes in the one-hop area.

$$0 \leq P_1 < \text{path\_loss}(d_1, h_{AN}, h_{GW}, f) - \text{path\_loss}(d_2 - R/2, h_{AN}, h_{AN}, f) \quad (6)$$

When the node is located in the multihop area, the third power control section 18 of the node controls the transmission power so that data reaches the destination node via a plurality of nodes in the one-hop area or the forced multihop area. For example, when the node is located in the multihop area of the area 4 in FIG. 4, the third power control section 18 of the node controls the transmission power so as to become electric power smaller than the minimum reception power $P_{rx}$ (dB) of the destination GW unit 1. When $P_{max}$ (dB) is the maximum transmission power of the node in the area 4 is and $P_2$ is a predetermined constant larger than 0, the third power control section 18 controls the transmission power $P_t$ (dB) so as to satisfy Expression 7:

$$P_t = P_{max} - P_2 \quad (7)$$

The transmit-data generating section 19 generates transmit data. For example, the transmit-data generating section 19 generates a packet including a sensor value obtained by a sensor coupled to the interior or outside of the node 10. The transmit-data generating section 19 generates a packet including values obtained by a wattmeter and so on coupled to the node 10.

The transmitting section 12 transmits the data generated by the transmit-data generating section 19 to the destination with the transmission power input from the first power control section 16, the second power control section 17, or the third power control section 18.

Figure 5:
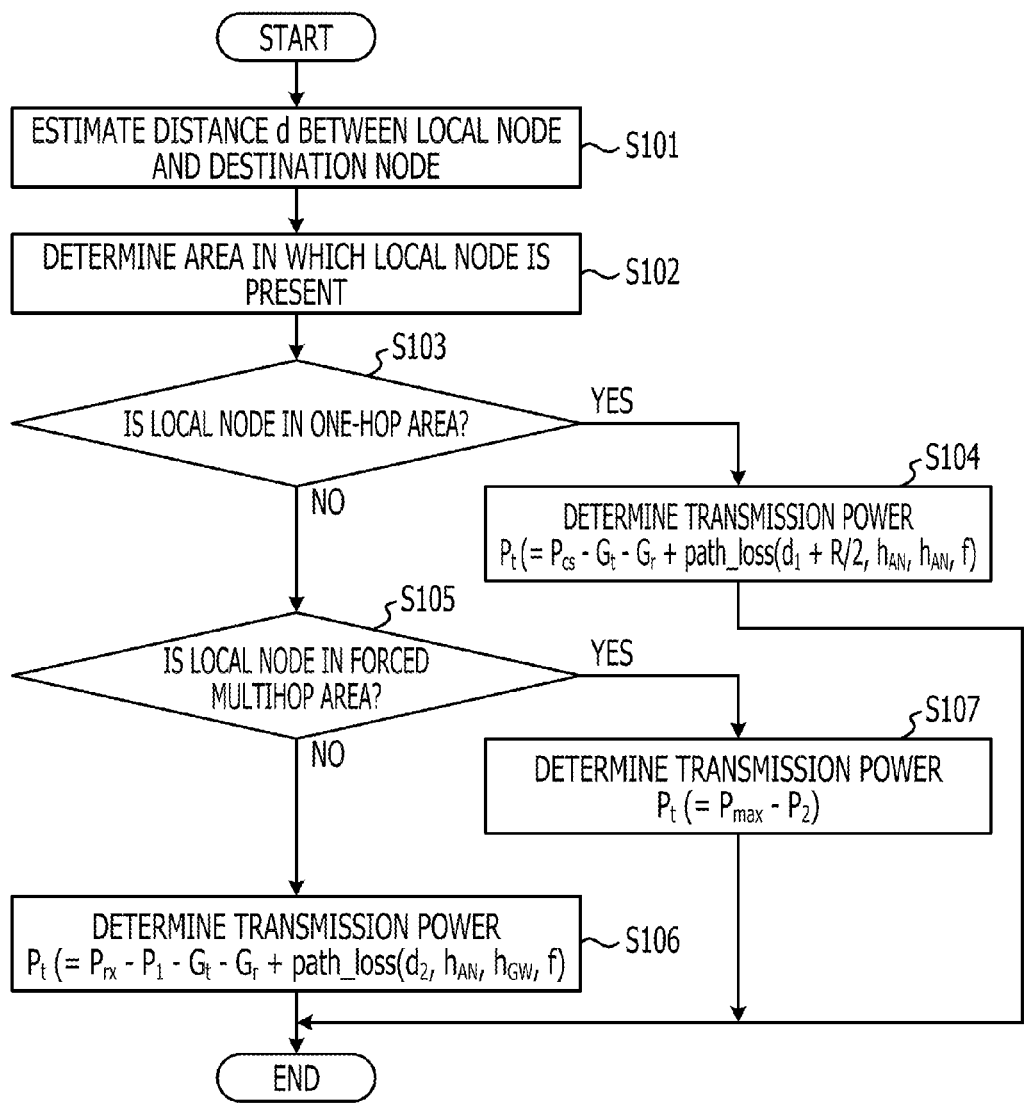
FIG. 5 illustrates an exemplary process of a node.

FIG. 5 illustrates an exemplary process of a node. The node in FIG. 5 may correspond to the nodes of the wireless communication system in FIG. 1. The position estimating section 14 of the node 10 estimates the distance d between the node 10 and the destination node based on the reception power of the known signal that the receiving section 11 has received from the destination node (S101).

The local-node-area determination section 15 determines an area in which the node 10 is present using the distance d estimated in S101 and the maximum distance R at which the destination node can directly communicate therewith (S102).

If the local-node-area determination section 15 determines that the area in which the node 10 is present is the one-hop area (S103: Yes), the first power control section 16 determines transmission power $P_t$ by using Expression 4 (S104).

If the area in which the node 10 is present is determined not to be the one-hop area (S103: No), the local-node-area determination section 15 determines whether the area in which the node 10 is present is the forced multihop area (S105).

If the local-node-area determination section 15 determines that the area in which the node 10 is present is the forced multihop area (S105: Yes), the second power control section 17 determines the transmission power $P_t$ using Expression 5 (S106). At that time, the second power control section 17 determines the transmission power $P_t$ so as to satisfy Expression 6.

If the local-node-area determination section 15 determines that the area in which the node 10 is present is not the forced multihop area (S105: No), the third power control section 18 determines the transmission power $P_t$ using Expression 7 (S107).

The transmitting section 12 executes carrier sensing, and after determining that the channel is idle, transmits data generated by the transmit-data generating section 19 with the transmission power determined in S104, S106, or S107.

Figure 6:
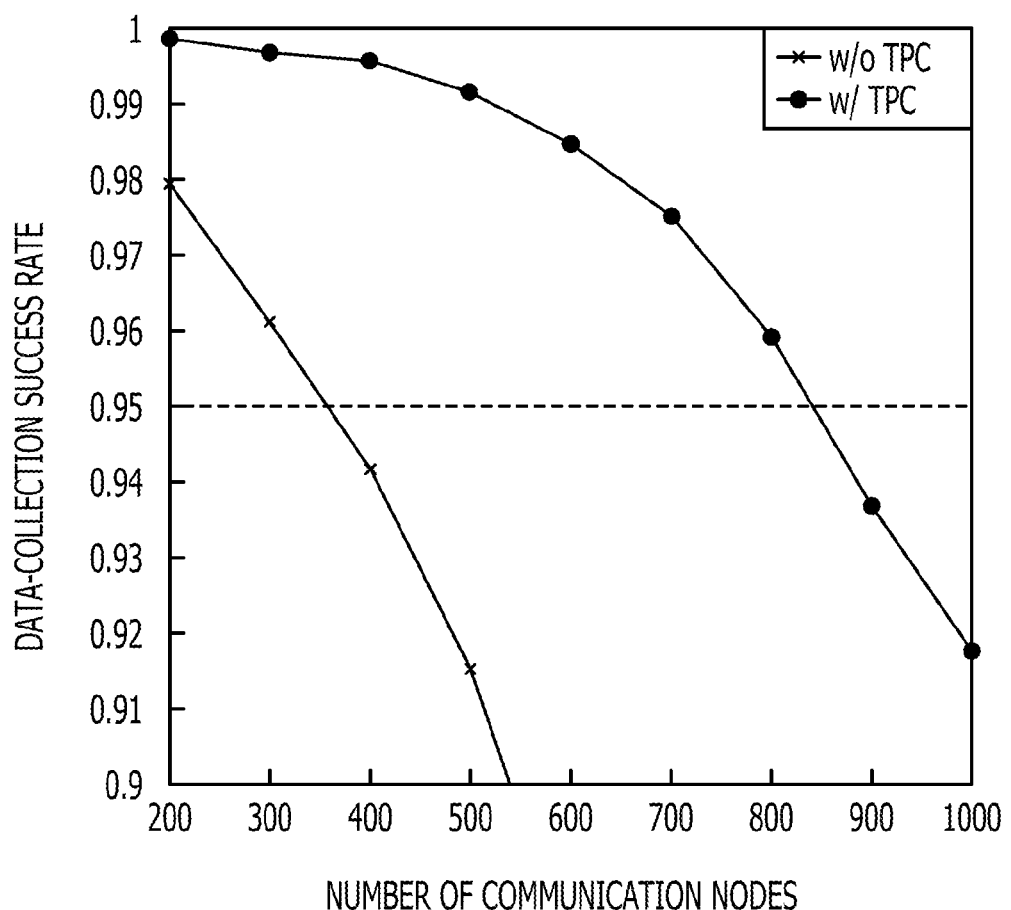
FIG. 6 illustrates an exemplary a result of a simulation.

FIG. 6 illustrates an exemplary result of a simulation. FIG. 6 illustrates the data-collection success rate plotted against the number of nodes coupled to the node 1 (GW unit) illustrated in FIG. 4.

For example, the antenna heights ($h_t$) of the nodes may be 2 m, the antenna height ($h_r$) of the GW unit 1 may be 2 m, the nodes may be disposed at random in a 4000 m by 4000 m square, and the GW unit 1 may be disposed nearly at the center of the region. Constant $P_1$ may be set at $P_1=5$, and constant $P_2$ may be set at $P_2=0$. The transmission packet sizes of the nodes may be 1,566 bytes, the specifications of the physical layer (PHY) and the media access control (MAC) may be in conformity to IEEE802.11b, and the data rate may be 1 Mbps.

Assuming a line of sight (LOS) environment, Expressions 8 to 10 are set for the propagation characteristics.

$$\text{Path\_loss}(d, h_t, h_r, f) = 20\log_{10}\frac{4\pi r D(d, h_t, h_r)}{c}f \quad (8)$$

$$D(d, h_t, h_r, f) = \begin{cases} 1 & (\text{if } d \le r_{bp}) \\ \dfrac{d}{r_{bp}(h_t, h_r, f)} & (\text{otherwise}) \end{cases} \quad (9)$$

$$r_{bp}(h_t, h_r, f) = \frac{4\pi h_r h_t}{c}f \quad (10)$$

where d (m) is the distance between the transmitter and the receiver, and c (m/s) is the speed of light.

As illustrated in FIG. 6, for a data collection success rate of 95%, the number of communication nodes when transmission power control is not performed may be about 380, and the number of communication nodes when transmission power control is performed may be about 880. The transmission power control may increase the number of communication nodes per one GW unit 1 to about 2.3 times.

The individual nodes control the transmission power depending on the distance from the destination node. For example, nodes located in the one-hop area perform carrier sensing to transmit data with the minimum transmission power that the other nodes in the same one-hop area can detect. Nodes located in the forced multihop area transmit data with the amount of power in the range in which the data transmission does not collide with data transmission by the nodes in the one-hop area. Nodes in the multihop area execute data transmission with electric power in the range in which data can reach the destination node via multihop relay. Therefore, the nodes transmit data with the amount of electric power according to the positions thereof as compared with a case in which the nodes transmit data with the maximum power, so that data collisions may be reduced. Since the nodes measure the distances from the GW unit 1 and so on at the point where they are fixed to a wattmeter or the like, the number of processes to be executed before data transmission may be reduced. Therefore, a decrease in the throughput of the network may be reduced.

The destination node may be either the GW unit 1 or any node.

For example, if the minimum reception power and so on of the individual nodes are known values, the transmission power and so on of the nodes in the one-hop area may be set to the values. The first area may be either within the distance d from the GW unit 1 or at a distance smaller than the maximum communication distance of the GW unit 1.

The distance between the node and the destination node may be estimated based on the power strength when a signal is received from the destination node. For example, the nodes may estimate the distance between the nodes and the destination node based on the positional information of the destination node. For example, the nodes request positional information from the destination node using a known signal, such as a HELLO message. The destination node acquires the coordinates thereof or the like using a global positioning system (GPS) and transmits the known signal, such as a HELLO message, which includes the coordinates indicating the position thereof, to the requestor nodes. The nodes may estimate the distance between local nodes and the destination node using the acquired positional information and the positional information of the nodes.

The area at half of the maximum communication distance with which the destination node can directly communicate may be set as the one-hop area. For example, any one-hop area within a distance smaller than the maximum communication distance, for example, one third as small as the maximum communication distance, may be set. For example, an area within a distance of one third of the maximum communication distance (R) from the destination node, (R/3), may be set as the one-hop area, an area from the distance of one third of the maximum communication distance (R), (R/3), to R may be set as the forced multihop area, and an area at the maximum communication distance (R) or larger may be set as the multihop area.

Either the foregoing processes may be automatically executed or all or part of the processes may be manually executed. The processing procedure, control procedure, names, and information including various items of data and parameters may be freely changed.

The components of the apparatus illustrated may be either a functional concept or a physical concept. The components may be functionally or physically distributed or integrated, depending on the load, the mode of operation, and so on. For example, the power control sections may be integrated to a single power control unit. All or part of the processes executed by the components may be executed either by a CPU, by programs implemented by the CPU, or by hardware using wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   a processor configured to perform operations to:
   estimate whether a node is located within a first area that is within a distance from a destination node in which the node and the destination node communicate directly with each other;
   set a first electric power larger than or equal to minimum power as a first transmission power if the node is estimated to be located in the first area, the minimum power being detected by another node at a largest distance from the node in the first area;

set a second electric power smaller than the minimum power as a second transmission power if the node is estimated to be located in an area other than the first area; and transmit data to the destination node with the first transmission power or the second transmission power.

2. The wireless communication apparatus according to claim 1, wherein the destination node and the node constitute a multihop wireless network.

3. The wireless communication apparatus according to claim 1, wherein the processor estimates whether the node is located within the first area based on a power strength when receiving data from the destination node or positional information obtained from the destination node.

4. The wireless communication apparatus according to claim 1, wherein the processor sets a transmission power to be the first transmission power if the node is located in a second area that is within twice the distance from the destination node and is other than the first area.

5. The wireless communication apparatus according to claim 1, wherein the processor sets a transmission power to be the second transmission power if the node is located in a third area other than the first area and the second area.

6. A method for wireless communication, comprising:
estimating, by a computer of a node, whether the node is located within a first area that is within a first distance from a destination node in which the node and the destination node communicate directly with each other;
setting a first electric power larger than or equal to minimum power as a first transmission power if the node is estimated to be located in the first area, the minimum power being detected by another node at a largest distance from the node in the first area;
setting a second electric power smaller than the minimum power as a second transmission power if the node is estimated to be located in an area other than the first area; and
transmitting data to the destination node with the first transmission power or the second transmission power.

7. The method for wireless communication according to claim 6, wherein the destination node and the node constitute a multihop wireless network.

8. The method for wireless communication according to claim 6, wherein an estimation of whether the node is located within the first area is performed based on a power strength when receiving data from the destination node or positional information obtained from the destination node.

9. The method for wireless communication according to claim 6, further comprising,
setting a transmission power to the first transmission power if the local node is located in a second area that is within twice the distance from a destination node and is other than the first area.

10. The method for wireless communication according to claim 6, further comprising,
setting a transmission power to the second transmission power if the local node is located in a third area other than the first area and the second area.

* * * * *